US008232971B2

(12) United States Patent
Whang et al.

(10) Patent No.: US 8,232,971 B2
(45) Date of Patent: Jul. 31, 2012

(54) AIRPLANE WINDOW CONTROL

(75) Inventors: Chongman Whang, Lynnwood, WA (US); Steve A. Chennault, Camano Island, WA (US); Chris Samhammer, Redmond, WA (US)

(73) Assignee: The Boeing Company, Chicago, IL (US)

( * ) Notice: Subject to any disclaimer, the term of this patent is extended or adjusted under 35 U.S.C. 154(b) by 799 days.

(21) Appl. No.: 11/947,874

(22) Filed: Nov. 30, 2007

(65) Prior Publication Data

US 2008/0066971 A1 Mar. 20, 2008

Related U.S. Application Data

(63) Continuation-in-part of application No. 11/828,861, filed on Jul. 26, 2007, and a continuation-in-part of application No. 29/247,626, filed on Jun. 29, 2006.

(60) Provisional application No. 60/824,282, filed on Aug. 31, 2006.

(51) Int. Cl.
*G06F 3/041* (2006.01)

(52) U.S. Cl. ........................................ 345/173; 362/471

(58) Field of Classification Search .......... 345/156–178; 178/18.01–18.09, 18.11; 359/275; 362/470–472; 349/16
See application file for complete search history.

(56) References Cited

U.S. PATENT DOCUMENTS

| | | | | |
|---|---|---|---|---|
| 4,564,789 | A | 1/1986 | Kokubu | |
| 4,832,468 | A | 5/1989 | Ito et al. | |
| 4,893,062 | A | 1/1990 | D'Aleo et al. | |
| 6,282,435 | B1 * | 8/2001 | Wagner et al. | 455/566 |
| 6,316,889 | B1 | 11/2001 | Chansky et al. | |
| 7,111,952 | B2 | 9/2006 | Veskovic | |
| 7,355,161 | B2 * | 4/2008 | Romig et al. | 250/221 |
| 7,534,016 | B2 * | 5/2009 | Stavaeus et al. | 362/471 |
| 2007/0057915 | A1 * | 3/2007 | Yamauchi | 345/156 |
| 2007/0152977 | A1 * | 7/2007 | Ng et al. | 345/173 |
| 2007/0278082 | A1 * | 12/2007 | Parkinson | 200/512 |
| 2007/0285759 | A1 * | 12/2007 | Ash et al. | 359/275 |

FOREIGN PATENT DOCUMENTS

EP 1585015 A1 * 10/2005

* cited by examiner

*Primary Examiner* — Stephen Sherman
(74) *Attorney, Agent, or Firm* — Parsons Behle & Latimer

(57) ABSTRACT

An electrically dimmable window ("EDW") system comprising an EDW, a control switch, and a controller. The switch and controller control the light transmittance level of the EDW. State indicators indicate when the EDW is in transition from one light transmittance level to another level. When there is no transition in light transmittance level, the indicators may denote the current light transmittance level of the EDW.

24 Claims, 7 Drawing Sheets

AIRPLANE WINDOW CONTROL

CROSS REFERENCE TO RELATED APPLICATIONS

This non-provisional patent application is a continuation-in-part of prior U.S. patent application Ser. No. 11/828,861 filed Jul. 26, 2007, which claims priority from U.S. Provisional Patent Application No. 60/824,282, filed on Aug. 31, 2006, and is in turn a continuation-in-part of prior U.S. patent application Ser. No. 29/247,626, filed Jun. 29, 2006, the contents of all of which prior applications are incorporated herein by reference.

TECHNICAL FIELD

The disclosure relates to a control for a vehicle window that will allow passengers to electronically shade their windows.

BACKGROUND

Mechanical shades are presently used on airplane windows. The shades can be opened to allow passengers to see the view outside. However, opening a shade even a small may let in too much light, which can be very distracting to passengers who may wish relax, sleep or view a movie. Further, a passenger is unable to view out the window when the shade is substantially closed.

A device, and/or method of use, is needed to decrease one or more problems with one or more of the existing devices and/or methods for controlling the shading of vehicle windows.

SUMMARY

The disclosed embodiments provide a control switch for controlling an electrically dimmable window (EDW). The control switch is simple in design and allows a user to intuitively determine its use. The control switch includes both visual and tactile features that allow a user to quickly understand how to operate the switch and associate its operation with resulting changes in window transmittance or "dimming level".

According to one disclosed embodiment, a control switch is provided for operating an electrically dimmable window, comprising: a generally circular touchpad adapted to be touched by a user for adjusting the light transmittance of the window, and indicator lights for indicating the light transmittance setting of the touchpad. The touchpad includes an upper portion for increasing the light transmittance of the window and a lower portion for decreasing the light transmittance of the window. The indicator lights are arranged in a generally arcuate array extending around the periphery of the upper and lower touchpad portions. The upper and lower touchpad portions each may be generally circular in shape and may be separated by a tactile line of demarcation. The upper and lower touchpad portions may be different shades of a color to allow a user to distinguish between the touchpad portion that increases or decreases the dimming setting.

According to another disclosed embodiment, a control switch is provided for operating an electrically dimmable window, comprising a unitary, generally circular touchpad adapted to be touched by a user for adjusting the light transmittance of the window. The touchpad includes an upper portion for increasing the light transmittance of the window and a lower portion for decreasing the light transmittance of the window. The touchpad further includes a tactile feature demarcating the upper touchpad portion from the lower touchpad portion. The control switch may further include indicator lights for indicating the light transmittance setting of the touchpad, wherein the indicator lights are arranged in a generally arcuate array extending around the periphery of the upper and lower touchpad portions. The touchpad may include a raised, central dome section, and a ring section surrounding the dome section. The array of indicator lights may extend around a portion of the ring section. The dome section may include two semi-circular portions, and the ring section may be recessed relative to the dome section.

According to still another embodiment, a control switch for operating an electrically dimmable window comprises: a generally circular touchpad adapted to be touched by a user for adjusting the light transmittance of the window; and, an arcuate array of indicator lights extending around the periphery of the touchpad for indicating the light transmittance setting of the window. The touchpad includes first and second touchpad portions adapted to be touched by a user for respectively increasing and decreasing the light transmittance of the window. At least certain of the indicator lights in the array are disposed adjacent to, and visually associable by user with the first touchpad portion, and others of the indicator lights in the array are disposed adjacent to, and visually associable by the user with the second touchpad portion. The first and second touchpad portions may each be generally circular in shape and are vertically aligned. The touchpad may include a one piece flexible member in which the first and second touchpad portions are defined, and a bezel surrounding the flexible member. The indicator lights may include light emitting diodes passing through a peripheral portion of the touchpad. The touchpad may include a raised central dome separated by a tactile line of demarcation into two semi-circular halves.

Other features, benefits and advantages of the disclosed embodiments will become apparent from the following description of embodiments, when viewed in accordance with the attached drawings and appended claims.

BRIEF DESCRIPTION OF THE DRAWINGS

The foregoing aspects and many of the attendant advantages of embodiments of this disclosure will become more readily appreciated by reference to the following detailed description, when taken in conjunction with the accompanying drawings, wherein.

DETAILED DESCRIPTION

An EDW is an electrical device that absorbs a range of wavelengths in the visible light spectrum when an electrical potential is applied. The present disclosure utilizes EDW to replace existing mechanical shades for airplane windows to provide more comfort to passengers and more control and easier operation to cabin crews. EDWs also can be used, without limitation, for lavatory doors, exit doors, and any partitions that may be present in the aircraft. In service, EDWs comply with all applicable existing Federal Aviation Administration and European Aviation Safety Agency requirements. In one embodiment, an EDW assumes an original predefined transparent state such as during a power outage, takeoff, landing, and/or an emergency situation (such as an emergency evacuation, for example), or whenever necessary.

Passenger Seat EDW

A passenger seat EDW provides more comfort to passengers because they can change the VLT level to accommodate their needs. In one embodiment, there are five VLT levels: opaque, transparent, and three intermediate settings between opaque and transparent. Of course, other embodiments may have up to an infinite number of VLT levels between opaque and transparent without departing from the spirit of the disclosure.

Figure 1:
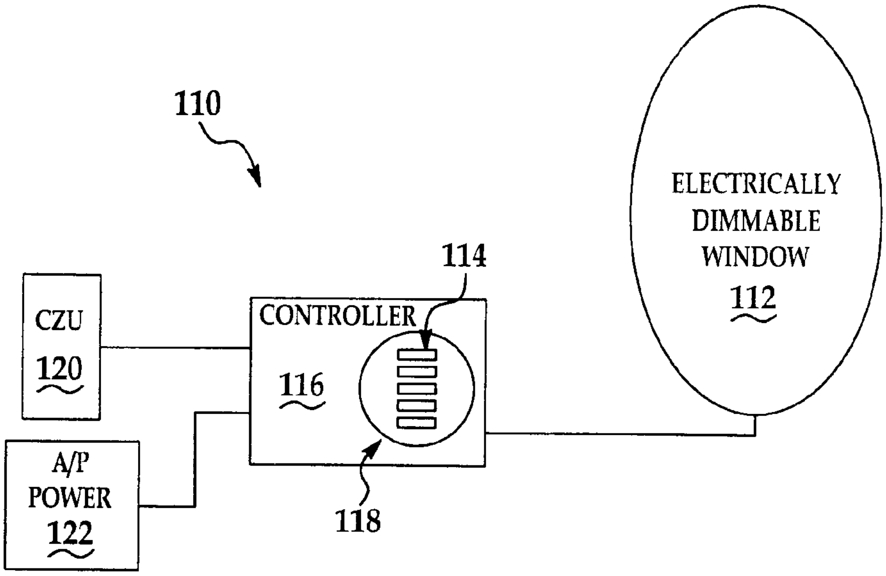
FIG. 1 depicts a general overview of a passenger seat EDW system of the disclosure.

FIG. 1 depicts a general overview of a passenger seat EDW System 110, which comprises an EDW 112, a controller 116, and EDW control switch 118. The EDW control switch 118 ideally is located in close vicinity to EDW 112. The switch 118 controls the VLT level of EDW 112, and the controller 116 communicates and interfaces with cabin zone unit ("CZU") 120 and EDW 112. The controller 116, which includes switch 118, comprises LED state indicators 114 that flash when EDW 112 is in transition from one VLT level to another level. When there is no transition in VLT level, one of the LED state indicators 114 remain continuously lit to denote the current VLT level of EDW 112. Controller 116 can also communicate and interface with the cabin service system ("CSS") (discussed in FIG. 2) and to EDW 112.

Figure 1A:
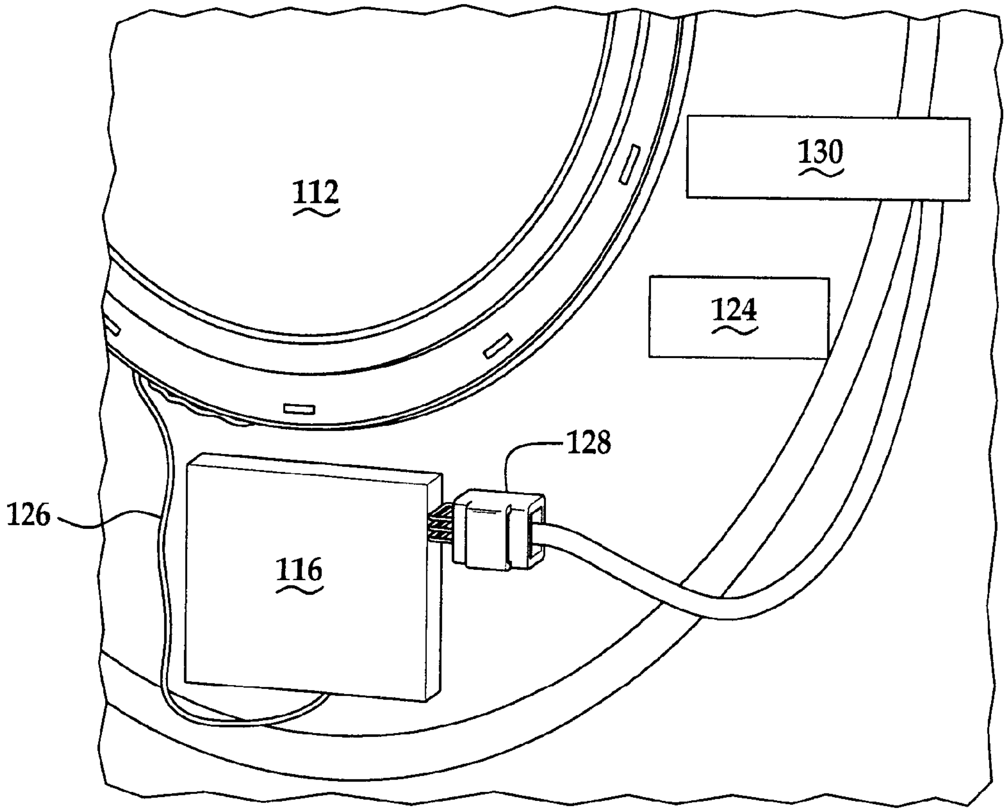
FIG. 1A depicts the location of a controller for an EDW system in a lower reveal of a window.

FIG. 1A depicts the relative location of a controller 116 in one embodiment of an EDW system 110 of the disclosure. FIG. 1A shows a controller 116 connected to an EDW 112 via a wire 126. The controller 116, in turn, is connected to a service loop 130 via a connector 128. As shown in FIG. 1A, controller 116, which contains EDW control switch 118 (not shown in FIG. 1A), is located in a lower portion of window reveal 124.

Figure 2:
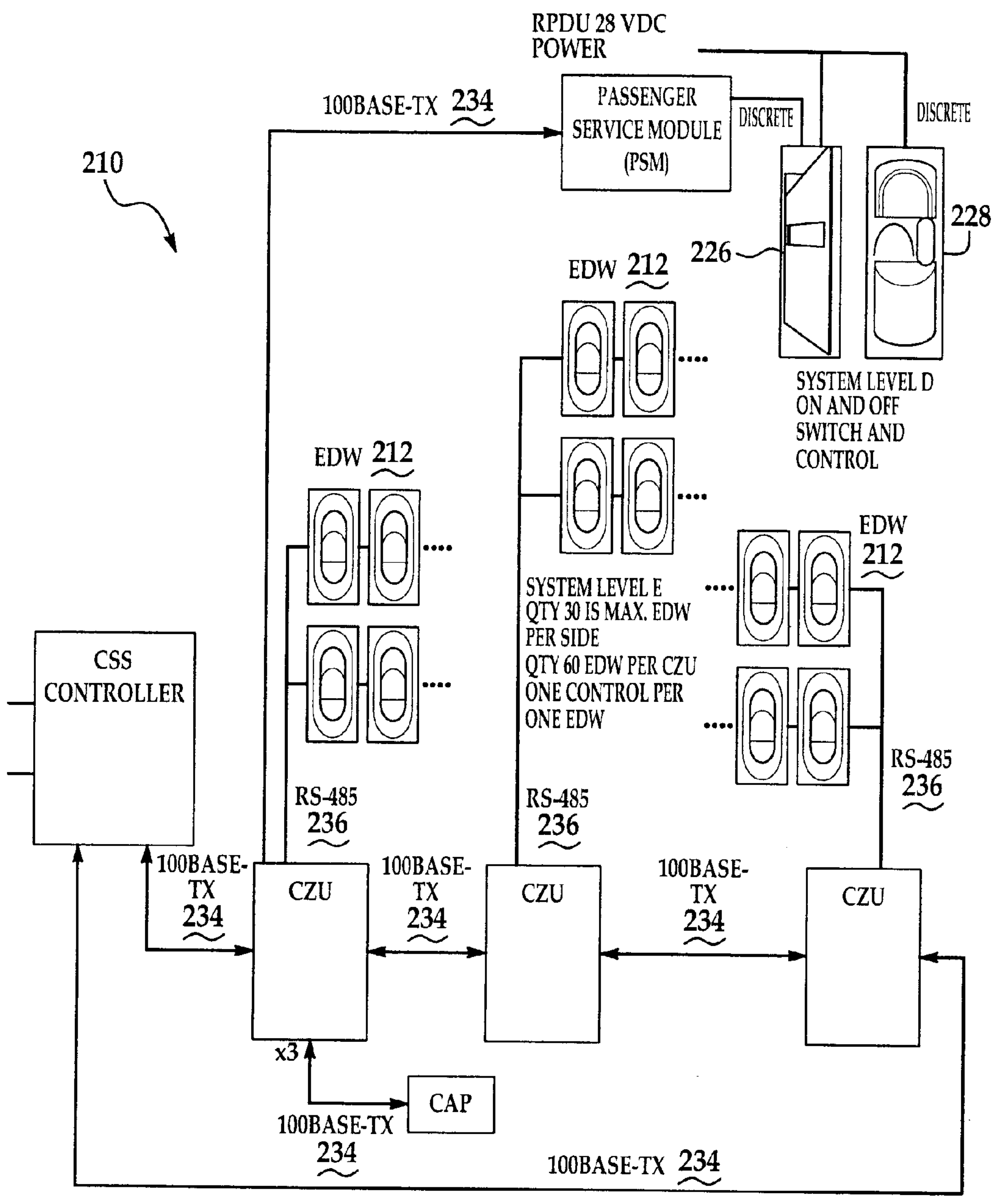
FIG. 2 shows an embodiment of an EDW system of the disclosure.

FIG. 2 shows an embodiment of an EDW System 210 comprising several EDW units 212 in communication with several CZU units 220 controlled by CSS controller 230 connected over an Ethernet network 234, only a portion of which is shown. In the embodiment shown in FIG. 2, the network is running at speeds of up to 100 Mbps, as indicated by the 100Base-TX connections, which is known in the art. CSS, also known in the art, provide control systems that allow, inter alia, passenger address announcements, cabin interphone system and cabin to cockpit crew communications, passenger services system for attendant call, lavatory availability, and seat controls, and cabin lighting. The disclosure makes use of CSS to likewise control EDW units. CZUs are components of CSS, providing crew-operated controls for CSS systems. In one implementation, CZUs provides such controls at three separate data hub control stations (not shown), one each in three main cabin zones (not shown), located between main airplane doors 1 and 2, 2 and 3, and 3 and 4 (not shown). In the embodiment shown in FIG. 2, CZU 220 communicates with EDW 212 via RS-485 serial interface 236.

Figure 3:
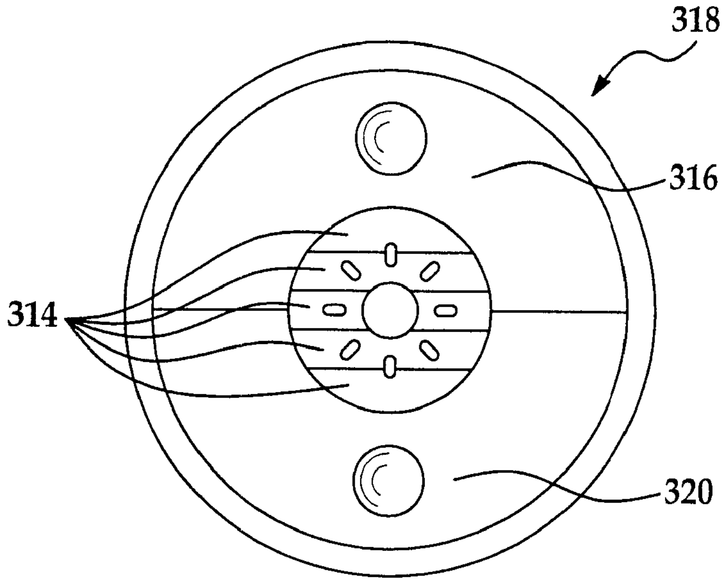
FIG. 3 shows a switch in an embodiment of an EDW system of the disclosure.

FIG. 3, an embodiment of an EDW control switch 318 in accordance with the disclosure is shown. EDW control switch 318 is an up/down-step type switch comprising an up-step switch portion 316, a down-step switch portion 320 and LED state indicators 314. In the embodiment shown, there are five LED state indicators 314; however, either more or less than five LED state indicators may be used depending on design choice without departing from the spirit of the disclosure.

Figure 4:
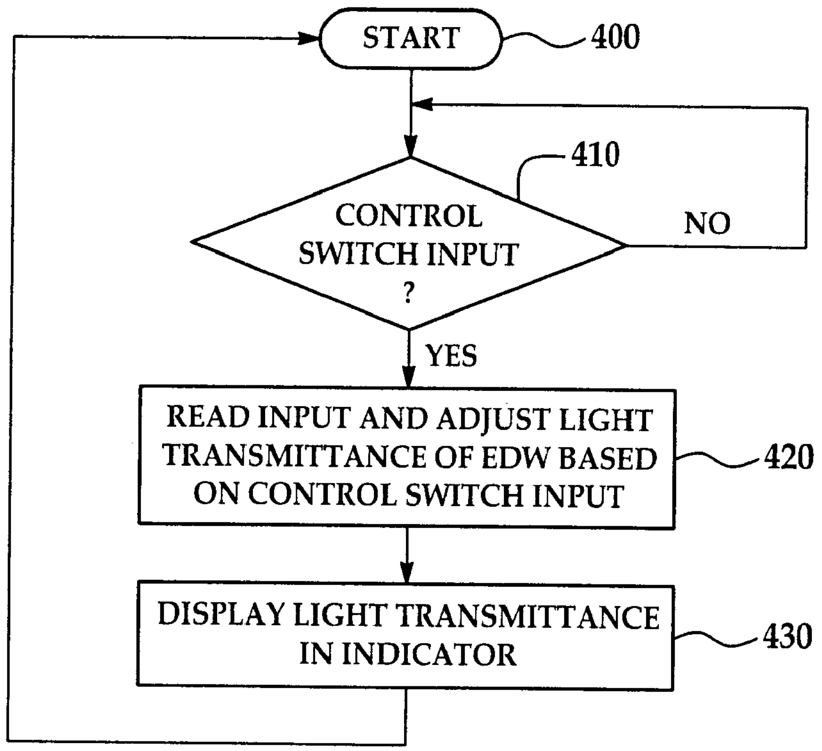
FIG. 4 shows a flowchart of a method of adjusting a light transmittance of an EDW of the disclosure.

FIG. 4 depicts a flowchart of a method for controlling an electrically dimmable window. In step 410, a determination is made whether or not there is any input from EDW control switch 118. If there is no input, the flowchart loops back to step 410 until an input appears on EDW control switch 118. Once there is an input from control switch 118, the input is read in step 420 and then the VLT level of EDW 112 is adjusted based on the input from EDW control switch 118. Thus, if the input from control switch 118 is for a lower VLT level, then the VLT level is lowered; if the input from control switch 118 is for a higher VLT level, then the VLT level is increased. The subsequent VLT level may then be displayed on state indicators 114.

Figure 5:
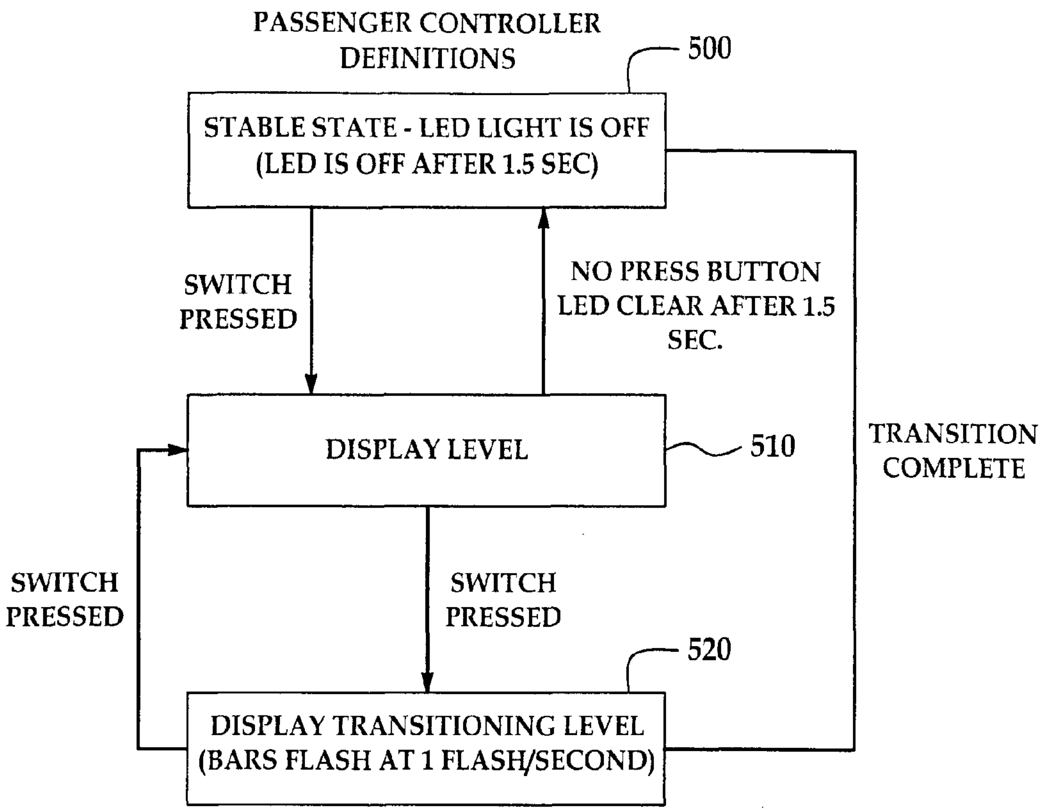
FIG. 5 shows a state transition diagram depicting a logical operation of passenger EDW control switch in accordance with the disclosure.

FIG. 5 shows a state transition diagram depicting a logical operation of EDW control switch 318 for use in conjunction with, for example, passenger window 112 in FIG. 1 or window 212 in FIG. 2. In stable state 500, LED state indicators 314 are off. When either up-step switch portion 316 or down-step switch portion 320 is pressed, the current VLT level on the relevant EDW is displayed in step 510 by lighting one of the LED state indicators 314. Other display means, such as a video monitor (not shown), may be used without departing from the spirit of the disclosure.

The LED state indicators 314 may be turned off or cleared after a certain time period if the EDW control switch 318 (either up-step switch portion 316 or down-step switch portion 320) is not pressed and control goes back to stable state 500. In one embodiment, the time period is 1.5 seconds as indicated in FIG. 5, but other time periods may be used without departing from the spirit of the disclosure.

However, if the EDW control switch 318 (either up-step switch portion 316 or down-step switch portion 320) is pressed, the VLT level is appropriately changed in state 520 and the LED state indicators 314 flash at a given interval. As shown in FIG. 5, in one embodiment of the disclosure, the flash interval is one flash per second; however, other flash intervals may be used without departing from the spirit of the disclosure. Once the transition to a VLT level is completed, the LED state indicators 314 are turned off or cleared and the system returns to stable state 500.

FIG. 2 also depicts the use of an EDW in a partition 226 and/or in a aircraft door 228. Although not shown in FIG. 2, the EDW System 210 may also be implemented in lavatories. All the function and system work the same way as described above; however, different embodiments may be implemented because of safety considerations, examples of which are described below.

Door EDW

With respect to aircraft door 228 shown in FIG. 2, emergency exit doors are typically designed with an outside viewing window that allows flight crews and/or passengers to quickly assess outside conditions before deciding to open such emergency exit doors in an emergency situation. As with the passenger windows, the door windows may also be equipped with EDW in lieu of a mechanical shade.

It must be kept in mind, however, that EDW installed on exit or emergency doors should not cause an unacceptable delay in a flight attendant's ability to quickly assess conditions outside the door. Thus, although door EDWs use the same technology as the other EDWs installed in the cabin (e.g., passenger windows and partitions), it is preferred that each EDW system installed on a door is completely independent of the other EDWs installed in the cabin. As shown in FIG. 2, the door EDW does not have interface to CSS controller 230. For safety reasons, main cabin door EDWs must be able to be operated independent of CSS so that a CSS failure has no impact on the main cabin entry/exit EDWs, which typically comprise eight doors. In the event an evacuation becomes necessary, each door EDW must be independently operable in order for a crew member to have a clear view outside the door EDW.

Although not shown, like in the passenger EDW system described in FIG. 1, the EDW control switch may be located near the door window. In one embodiment, the EDW control switch will allow the door window to change between two states: opaque and transparent. When the door window is in the opaque state, the EDW control switch will illuminate and be viewable by a user such as, for example, a seated flight attendant, under all interior lighting conditions. When the door window is in the transparent state, the EDW control switch will not be illuminated.

Figure 6:
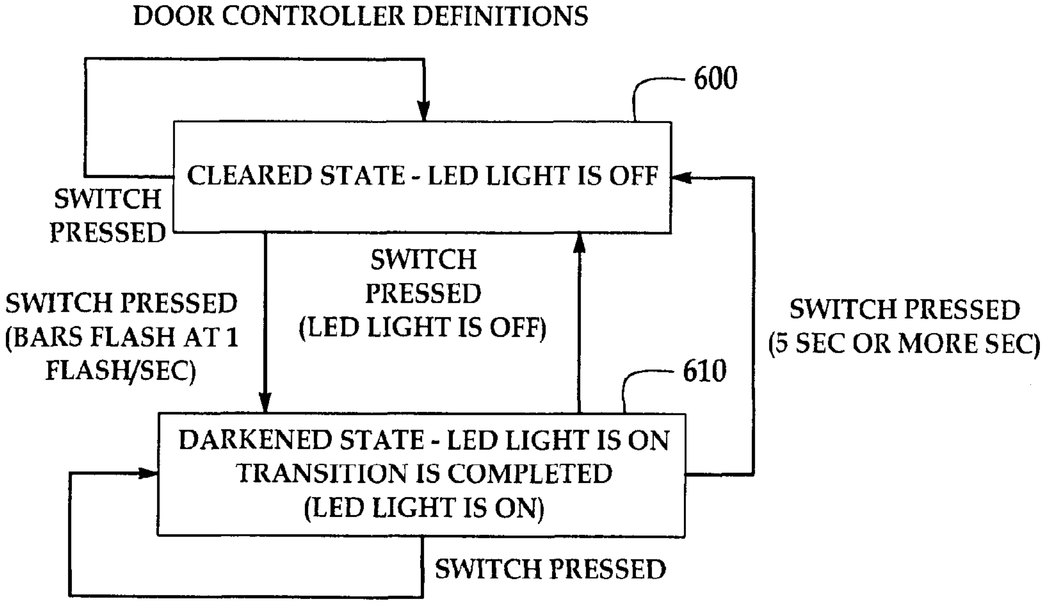
FIG. 6 shows a state transition diagram depicting a logical operation of door EDW control switch in accordance with the disclosure.
Figure 7:
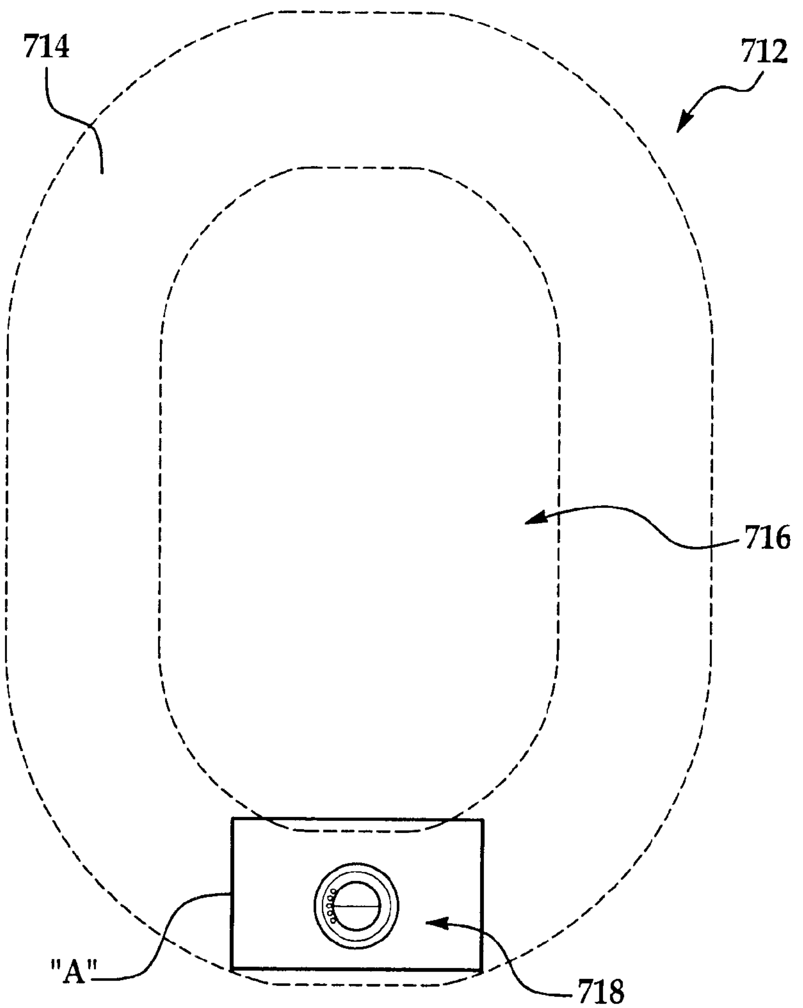
FIG. 7 is a front elevational view illustrating an alternate embodiment of a window control in relation to a window outlined in phantom.
Figure 8:
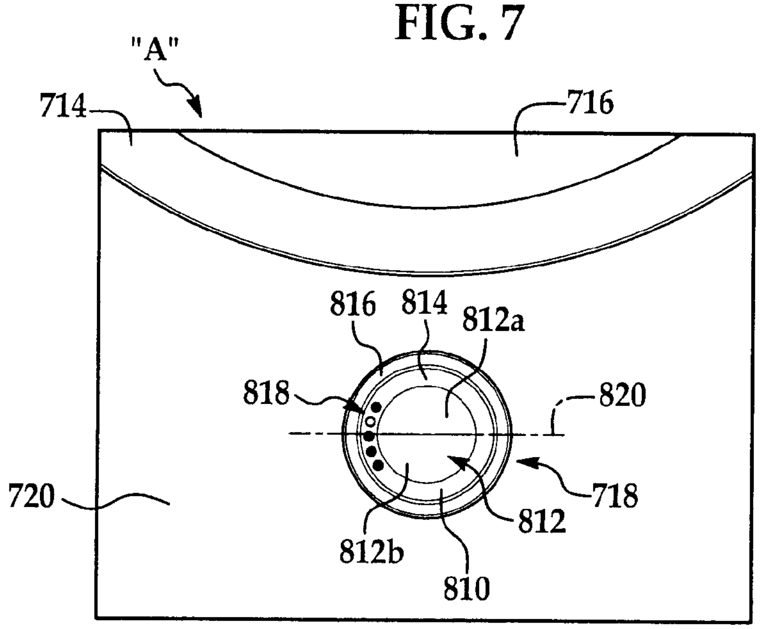
FIG. 8 is an enlarged elevational view of the area indicated at "A" in FIG. 7.
Figure 9:
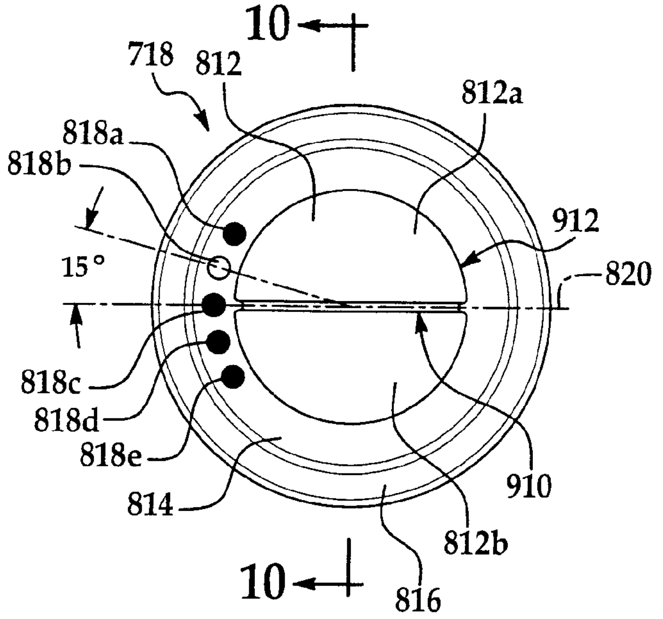
FIG. 9 is an enlarged elevational view of the window control shown in FIGS. 7 and 8.

FIG. 6 shows a state transition diagram depicting a logical operation of EDW control switch 318 for use in conjunction with a door EDW. In cleared state 600, LED state indicators 314 are off. When either up-step switch portion 316 or down-step switch portion 320 is pressed, the door EDW switches from one state to the other. Thus, assuming that the door EDW is transparent when in the cleared state 600, pressing control switch 318 will change the VLT level to opaque and transition to and remain in darkened state 610. During the transition, LED state indicators 314 may flash at a specified interval such as one flash per second as shown in the embodiment depicted in FIG. 6. If the user continuously presses control switch 318 for a particular time period, such as five seconds or more in the embodiment depicted in FIG. 6, the VLT level will return to the transparent or cleared state 600.

However, if the VLT level is opaque, such that the EDW control switch 318 is in darkened state 610, pressing EDW control switch 318 (i.e., either upstep switch portion 316 or down-step switch portion 320) will change the VLT level to transparent and EDW control switch 318 will remain in cleared state 600.

For safety reasons, the un-powered operational mode of the door EDW is the transparent state. Thus, in the event of the loss of power or system failure, the door window will default to the transparent state. Also, aside from the loss of airplane power, there is no single failure, such as a CSS failure as previously described, that can affect more than one door EDW 228.

Even if a door EDW 228 is in an opaque state, the door EDW 228 will allow recognition of an external fire. In one embodiment, the door EDWs 228 at the opaque state will allow more VLT than a passenger seat EDW (such as, for example, 112 or 212) at the most opaque state—in other words, door EDWs 228 will not be allowed to get as dark as the passenger windows 112 or 212. In one embodiment, the opaque or darkest level for either EDW 112 or EDW 228 will allow recognition of an external fire.

In another embodiment, the door EDWs 228 will always be in the transparent state whenever an emergency evacuation could be declared. The illuminated EDW control switch (not shown) provides an additional means to allow the flight attendant to verify the status of the door windows 228. However, even if a door window 228 was inadvertently left in the opaque state when an emergency evacuation was declared, the window 228 would provide enough visible light transfer to allow recognition of an external fire, as previously stated. In addition, the door EDWs 228 will automatically transition to the clear state when the normal airplane power is shut off (shutting off the normal airplane power is part of the flight crew procedures when an emergency evacuation is declared). This automatic clearing will also assist ground rescue personnel in assessing conditions inside the airplane.

Lavatory EDW

Lavatories may also include EDWs that may be completely dark or opaque when a lavatory is occupied, which may be triggered, for example, by a user locking the door of the lavatory. Once the user unlocks the door, the EDW 112 will revert to its original transparent state, in a way similar to the function of a partition EDW 226 discussed below.

Partition EDW

EDWs may also be used in cabin partitions such as 226 in FIG. 2, which, as previously described, may operate in an opaque state and a transparent state. In one embodiment, cabin crews have total control over VLT levels for partition EDWs 226 through cabin attendant panel, discussed below. Partition EDWs 226 can be implemented to be in an original transparent state to enable cabin crew members to see seated passenger and the cabin. Partition EDWs 226 work the same way as, e.g., EDWs 112 and 228, except that partition EDW 226 may have a backup mechanical switch to control the EDW 226 manually.

In another embodiment, however, partition EDW 226 may operate in a manner similar to the operation of EDW 112 or 212 described above. In other words, rather than operating only in an opaque or transparent VLT level, EDW 226 may have up to an infinite number of VLT levels between opaque and transparent without departing from the spirit of the disclosure.

Cabin Attendant Panel

In one embodiment, cabin crew members will have primary control over the VLT levels with the ability to transfer some control to the passengers as appropriate by use of a cabin attendant panel ("CAP") 232, shown in FIG. 2. Using the CAP 232, cabin crews will have primary control over the allowed VLT level for windows within a particular zone such as, for example, first class zone, business class zone, coach zone, all left-side windows, all right-side windows, all windows, or any combination thereof, and will have the ability to transfer some control to the passengers as cabin crew members deem appropriate.

Normal airplane power is used for all EDWs. If the airplane transitions from normal power to emergency power, the EDWs will automatically transition to the transparent state. In the event of switch failure, cabin service system has full control that the window can go to originally defined transparent state if it is necessary. When there is a loss of communication between cabin service system and controller or CSS failure, a passenger has full control over VLT level that it can go to originally defined transparent state if it is necessary. In one embodiment, a loss of communication status in connection with passenger window EDW function is in effect if no messages are received from the CSS for a period of at least 2 minutes.

Figure 10:
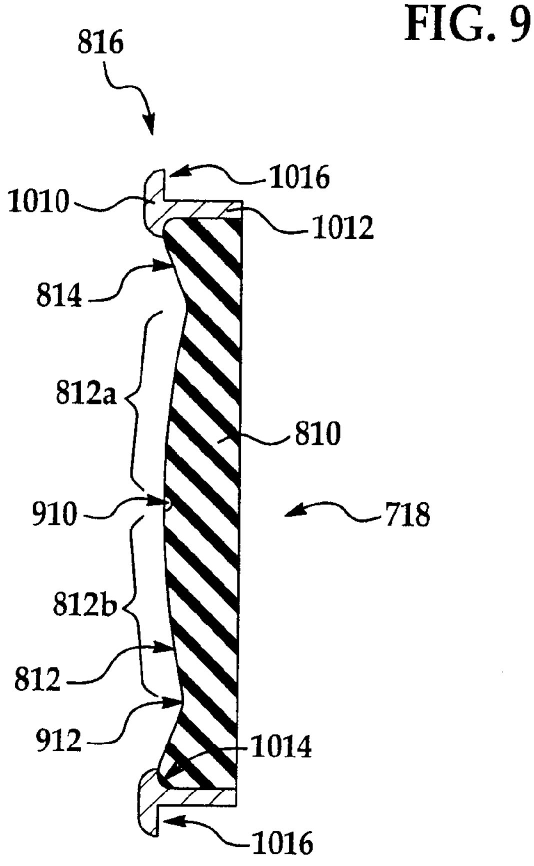
FIG. 10 is a sectional view taken along the line 10-10 in FIG. 9.

Referring now to FIGS. 7-10, an alternate embodiment of a window control 718 for controlling EDWs may be mounted in the area of a surround 714 of a cabin window 712 having an EDW 716 that is controlled by the control 718. In the illustrated example, the window control 718 is centrally positioned beneath the EDW 716, however the window control 718 may be placed at other locations in a cabin wall 720 in proximity to the window 712 so that a passenger may readily associate the window control 718 with controlling the EDW 716. The window control 718 broadly includes a one piece or unitary inner-portion 810 surrounded by a ring shaped bezel 816. As best seen in FIG. 10, the bezel 816 may comprise for example and without limitation, a molded thermoplastic material and includes an outer frame portion 1010 connected with a cylindrical body portion 1012. The body portion 1012 extends inwardly into an opening (not shown) in the sidewall 720 and surrounds the inner portion 810. The frame portion 1010 includes an inner-shoulder 1014 that bears against the inner portion 810, and an outer-shoulder 1016 that bears against the cabin sidewall 720.

The one piece inner portion 810 includes a central, circularly shaped dome portion 812 surrounded by an inner ring portion 814. The inner ring portion 814 is inclined to create a ring shaped recess 912 that surrounds the dome portion 812. The dome portion 812 includes upper and lower semi-circular portions 812*a*, 812*b* respectively, which are separated by a line of demarcation 910 which in the illustrated embodiment, comprises a groove. The groove 910 provides tactile separation of the upper and lower touchpad portions 812*a*, 812*b* so that a passenger can readily determine by touch which portion 812*a*, 812*b* his or her finger is contacting. Alternatively, the line of demarcation 910 may comprise a raised rib (not shown) or other linear feature that can be readily felt by the passenger. In the illustrated example, the line of demarcation 910 extends horizontally so that the touchpad portions 812*a*, 812*b* are oriented in an "up-down" arrangement, allowing the passenger to associate the upper portion 812*a* with increasing the transmittance of the EDW 716, and to associate the lower portion 812*b* with decreasing the transmittance.

In order to visually reinforce the up-down operation of the touchpad portions 812*a*, 812*b*, the color of the upper portion 812*a* may be chosen to be lighter than the color of the lower portion 812*b*. In one embodiment, for example, the upper portion 812*a* may be a white pearlescent color, while the lower portion 812*b* may comprise a silver pearlescent color. The coloration of the touchpad portions 812*a*, 812*b* may be achieved by painting, screen printing, overlays or molding techniques. Also, the touchpad portions 812*a*, 812*b* may be formed from a silicone material in which coloration is achieved by infusing a silicone based ink into the surface of the touchpad portions 812*a*, 812*b*.

In order to provide the passenger within visual indication of the current or selected transmittance setting a plurality of indicator lights 818 are provided which are arranged in an arcuate array within the inner ring 814. In the illustrated example, the indicator lights 818 comprise LEDs which are held within openings (not shown) in the inner ring 814. The indicators lights 818 may comprise other known technologies, including, without limitation, OLED's, PLED's, POLED's, incandescent filaments or fluorescence. The indicator lights 818 may be arranged in an ascending order of EDW transmittance, so that, for example, the top light 818*a* indicates maximum transmittance (e.g. clear), and the bottom light 818*e* indicates minimum transmittance which may be, for example, completely opaque. As in the case of the previously described window control switch 318 (FIG. 3), the current state of window transmittance may be indicated by the corresponding light 818 being steadily on. The passenger may toggle the window settings by pressing either the upper or lower touchpad portions 812*a*, 812*b*, in which case one of the lights 818 will illuminate in response to the toggle setting, and may begin flashing until the selected setting has been achieved.

In the illustrated example, the indicator lights 818 are spaced at 15 degree angles relative to each other around the inner ring 814, however other angles are possible, depending upon the application. In the illustrated example, five indicator lights 818 are provided, with the middle light 818*c* positioned along the centerline 820 which is coaxial with the line of demarcation 910. Thus two of the lights 818 are disposed above the centerline 820 and may be visually associated with the upper touchpad portion 812*a*, while the remaining indicator lights 818 are disposed beneath the centerline 820 and can be visually associated by the passenger with the lower touchpad portion 812*b*.

Figure 10A:
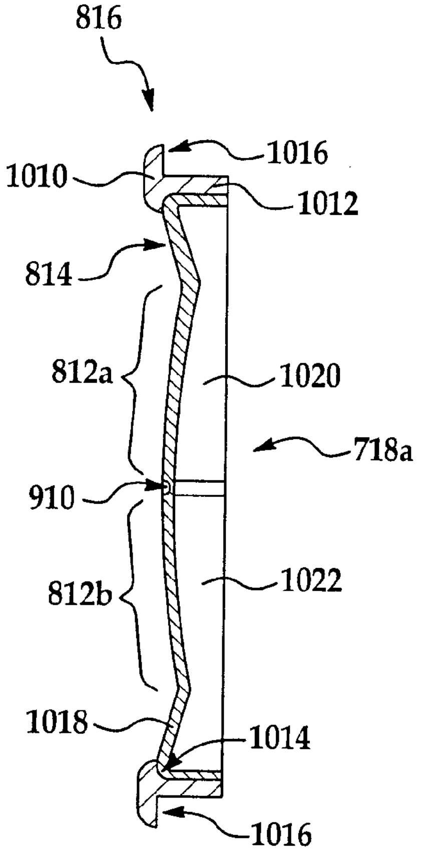
FIG. 10*a* is a sectional view similar to FIG. 10 but illustrating an alternate embodiment of the control switch.

The touchpad 812 may include integrally formed electrical switches (not shown) using any of various technologies, including pressure sensitive electrical contacts, or inductive or capacitive coupling techniques. For example, as shown in FIG. 10*a*, the touchpad 812 may comprise a one piece cover 1018 formed, for example, without limitation, by molding an elastomeric material. A pair of pressure sensitive switches 1020, 1022 are disposed beneath the cover 1018. The cover 1018 is readily flexible, thus permitting a user to depress either of the touchpad portions 812*a*, 812*b*, which in turn actuates the corresponding pressure sensitive switch 1020, 1022. Although not shown in the drawings, additional tactile features may be incorporated into the touchpad 812 which allow the passenger to verify that a switch 1020, 1022 has been actuated. For example, such switch devices commonly employ mechanical features that provide the user with a "click" sensation that can be felt or heard when the switch is actuated.

Figure 11A:
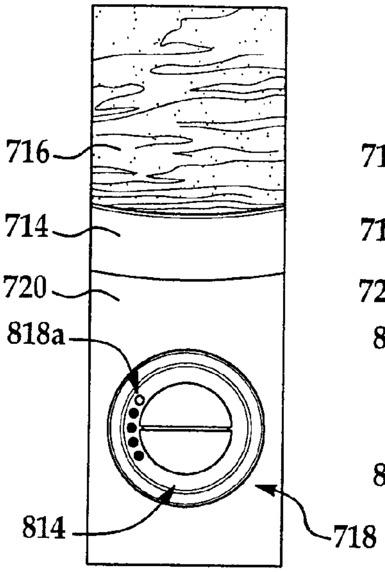
FIGS. 11*a*-11*e* are elevational views of the window control, and showing an electrically dimmable window at progressively greater opacity settings.
Figure 11B:
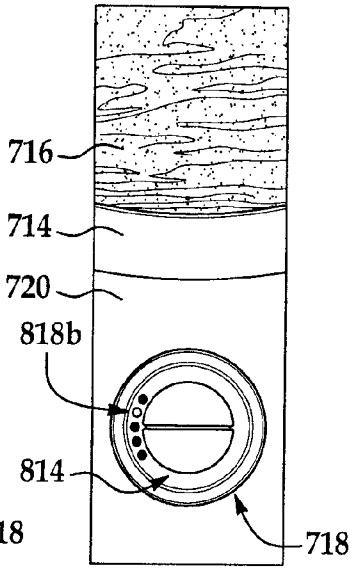
Figure 11C:
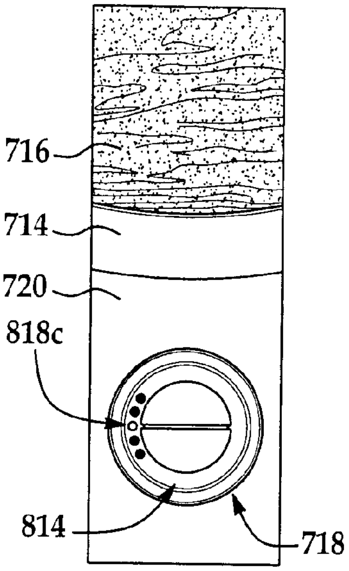
Figure 11D:
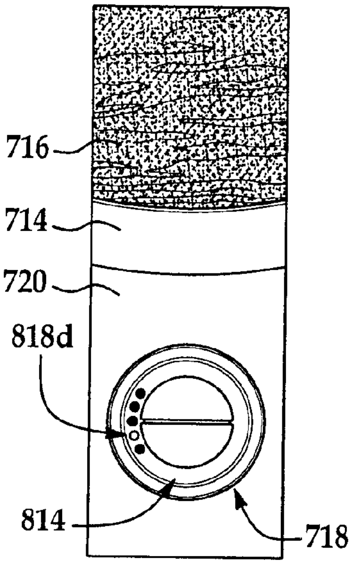
Figure 11E:
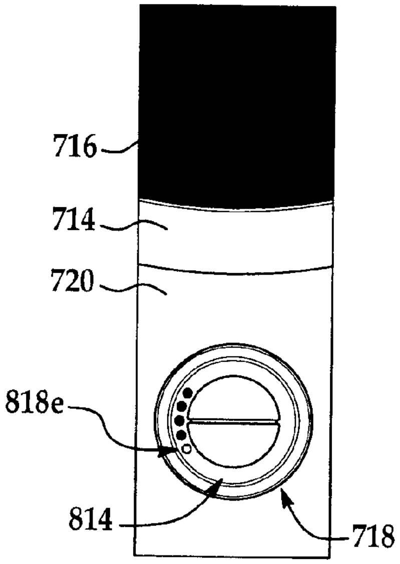

Attention is now directed to FIGS. 11*a*-11*e* which illustrate how passenger toggling of the window control 718 changes window transmittance. Beginning with FIG. 11*a*, the EDW 716 is at its highest level of transmittance, which may be, for example, completely clear. In this state, the uppermost indicator light 818*a* is illuminated. FIGS. 11*b*-11*d* show progressively dimmer window settings where light transmittance is reduced. These window settings result in a corresponding indicator light 818*b*, 818*c*, 818*d* and 818*e* to be illuminated, thus indicating to the passenger the current setting. FIG. 11*e* shows a transmittance setting that is essentially opaque or black. This opaque setting is indicated by the illumination of the indicator light 818*e*.

Although the embodiments of the disclosure have been illustrated and described with specific embodiments for use in an aircraft, it will be appreciated that the embodiments can be used in other vehicles including without limitation buses, boats, trains, and cars and that various changes can be made therein without departing from the spirit and scope of the disclosure. Within the scope of the appended claims, it is to be understood that the embodiments of the disclosure can be practiced otherwise than as specifically described herein.

What is claimed is:

1. A control switch for operating an electrically dimmable window, comprising:

a unitary generally circular touchpad adapted to be touched by a user for adjusting the light transmittance of the window, the touchpad including an upper portion for increasing the light transmittance of the window and an immediately adjacent lower portion for decreasing the light transmittance of the window, said touchpad operable by an operator directly touching said touchpad; and indicator lights for indicating the light transmittance setting of the touchpad, the indicator lights being arranged in a generally arcuate array extending circumferentially around the periphery of the upper and lower touchpad portions, and arranged in an order of relative transmittance level of the window.

2. The control switch of claim 1, wherein the upper and lower touchpad portion are each generally semicircular in shape.

3. The control switch of claim 1, wherein the upper and lower touchpad portions are separated by a tactile line of demarcation.

4. The control switch of claim 1, wherein the upper touchpad portion is visually lighter in color than the lower touchpad portion.

5. The control switch of claim 1, wherein the touchpad includes a unitary touchpad cover, and the upper and lower touchpad portions are integrally formed in the touchpad cover.

6. The control switch of claim 5, wherein:

the touchpad includes first and second electrical switch members, and the touchpad cover is formed from a flexible material overlying the first and second electrical switches.

7. The control switch of claim 1, wherein the touchpad includes:

a one piece flexible member in which the upper and lower touchpad portions are defined, and a bezel surrounding the flexible member.

8. The control switch of claim 1, wherein the indicator light pass through a peripheral portion of the touchpad.

9. A control switch for operating an electrically dimmable window, comprising:

a unitary, generally circular touchpad adapted to be touched by a user for adjusting the light transmittance of the window, the touchpad including an upper portion for increasing the light transmittance of the window and an immediately adjacent lower portion for decreasing the light transmittance of the window, the touchpad further including a tactile feature demarcating the upper touchpad portion from the lower touchpad portion, said touchpad operable by an operator directly touching said touchpad; and indicator lights for indicating the light transmittance setting of the touchpad, the indicator lights being arranged in a generally arcuate array extending circumferentially around the periphery of the upper and lower touchpad portions and arranged in an order of relative transmittance level of the window.

10. The control switch of claim 9, wherein the upper touchpad portion is visually lighter in color than the lower touchpad portion.

11. The control switch of claim 9, wherein the touchpad includes:

a raised central dome section, and a ring section surrounding the dome section.

12. The control switch of claim 11, wherein the indicator lights extend circumferentially around a portion of the ring section for indicating the light transmittance setting of the touchpad.

13. The control switch of claim 11, wherein:

the dome section includes two semicircular portions, and the ring section is recessed relative to the dome section.

14. The control switch of claim 11, wherein the dome section includes two semicircular portions, and the tactile feature includes a line extending between the semicircular portions allowing a user to distinguish by touch between the semicircular portions.

15. The control switch of claim 14, wherein at least some of the indicator lights are disposed above the line and at least others of the indicator lights are disposed below the line.

16. A control switch for operating an electrically dimmable window, comprising:

a unitary generally circular touchpad adapted to be touched by a user for adjusting the light transmittance of the window, the touchpad including first and second immediately adjacent touchpad portions adapted to be touched by a user for respectively increasing and decreasing the light transmittance of the window, said touchpad operable by an operator directly touching said touchpad; and, an arcuate array of indicator lights extending circumferentially around the periphery the touchpad for indicating the light transmittance setting of the touchpad and arranged in an order of relative transmittance level of the window, at least certain of the indicator lights in the array being disposed adjacent to and visually associable by the user with the first touchpad portion, and others of the indicator lights in the array being disposed adjacent to and visually associable by the user with the second touchpad portion.

17. The control switch of claim 16, wherein the first and second touchpad portions are each generally semicircular in shape and are vertically aligned.

18. The control switch of claim 17, wherein the first and second touchpad portions are separated by a tactile line of demarcation.

19. The control switch of claim 16, wherein the first touchpad portion is visually lighter in color than the second touchpad portion.

20. The control switch of claim 16, wherein the touchpad includes:

a one piece flexible member in which the first and second touchpad portions are defined, and a bezel surrounding the flexible member.

21. The control switch of claim 16, wherein the indicator lights include light emitting diodes passing through a peripheral portion of the touchpad.

22. The control switch of claim 16, wherein the touchpad includes:

a raised central dome section separated into upper and lower halves, and a ring section surrounding and recessed relative to the dome section.

23. The control switch of claim 16, wherein the touchpad includes a raised central dome separated by a tactile line of demarcation into two semicircular halves.

24. A control switch for operating an electrically dimmable window, comprising:

a unitary generally circular touchpad adapted to be touched by a user for adjusting the light transmittance of the window, the touchpad including a dome shaped central section separated by a tactile line of demarcation into an upper semicircular touchpad portion for increasing the light transmittance of the window and an immediately adjacent lower semicircular touchpad portion for decreasing the light transmittance of the window, the upper touchpad portion being visually lighter in color than the lower touchpad portion, the touchpad further including a recessed ring section surrounding the dome shaped central section, said touchpad operable by an operator directly touching said touchpad; and an arcuate array of indicator lights for indicating the light transmittance setting of the touchpad, the indicator lights being arranged in a generally arcuate array extending circumferentially around the ring section and arranged in an order of relative transmittance level of the window, at least certain of the indicator lights in the array being disposed adjacent to and visually associable by the user with the upper touchpad portion, and others of the indicator lights in the array being disposed adjacent to and visually associable by the user with the lower touchpad portion.

* * * * *